United States Patent [19]

Hayakawa et al.

[11] Patent Number: 5,111,222
[45] Date of Patent: May 5, 1992

[54] PRESSURE ALARM IN WATER-SEALED CAMERA

[75] Inventors: Masahiro Hayakawa, Yokohama; Kousei Kosako, Tokyo, both of Japan

[73] Assignee: Asahi Kogaku Kogyo Kabushiki Kaisha, Tokyo, Japan

[21] Appl. No.: 561,719

[22] Filed: Aug. 1, 1990

[30] Foreign Application Priority Data

Aug. 3, 1989 [JP] Japan .......................... 1-91610[U]
Feb. 16, 1990 [JP] Japan .............................. 2-35677
Feb. 16, 1990 [JP] Japan .............................. 2-35678

[51] Int. Cl.⁵ ............................................. G03B 17/08
[52] U.S. Cl. ...................................... 354/64; 358/99; 340/605; 200/61.05; 200/81.6
[58] Field of Search ............................ 354/64; 358/99; 318/643, 645; 340/626, 614, 603, 605, 611; 200/61.05, 81.6, 83 C

[56] References Cited

U.S. PATENT DOCUMENTS

| | | | |
|---|---|---|---|
| 4,024,363 | 5/1977 | Marsing et al. ............... | 200/83 C |
| 4,312,580 | 1/1982 | Schwomma et al. ........... | 354/64 |
| 4,470,680 | 9/1984 | Inagaki ......................... | 354/64 |
| 4,634,253 | 1/1987 | Tamamura ..................... | 354/403 |
| 4,763,145 | 8/1988 | Takamura et al. .............. | 354/64 |
| 4,864,959 | 9/1989 | Takamizawa et al. .......... | 340/605 |

FOREIGN PATENT DOCUMENTS 63-113137 7/1988 Japan .
1397225 6/1975 United Kingdom .

Primary Examiner—W. B. Perkey
Assistant Examiner—Cassandra C. Spyrou
Attorney, Agent, or Firm—Sandler, Greenblum & Bernstein

[57] ABSTRACT

In a camera adapted to be sealed against water, the camera having a reciprocating lens barrel, a member for detecting water around the camera, and for controlling the lens barrel, so that the lens barrel will not be moved when water is detected by the detecting member. In another embodiment the camera is provided with a member for detecting water at a certain hydraulic pressure and a member for indicating an alarm when water at such a pressure is detected. Thus, by immobilizing the lens barrel, it is possible to prevent water damage to the camera that might result if the camera were submerged and the lens barrel moved.

19 Claims, 8 Drawing Sheets

PRESSURE ALARM IN WATER-SEALED CAMERA

BACKGROUND OF THE INVENTION

The present invention relates to a camera, more particularly to a camera constructed to be sealed against water.

Cameras having movable lens barrels such as zoom lens barrels, for example, multifocus cameras and the like are arranged in such a manner that the total internal volume thereof varies as the lens barrel reciprocates. When the outside and inside of the camera are completely sealed, the air pressure within the camera sharply decreases as the lens is forwardly moved. Consequently, it becomes necessary to supply great force to the lens to move it forward. For this reason, it has been very hard to produce a completely water-proof camera.

In order to solve the aforementioned problem, the present assignee proposed a drip-proof camera having a breath hole (i.e. a venting hole) for making the inside and outside of the camera body communicable, i.e., permeable, with each other, in Japanese Utility Model Provisional Publication SHO 63-113137. In this case, the breath hole is covered with an air breathing but water-impermeable filter. The lens mounted on this camera is therefore moves smoothly, whereas water is prevented from penetrating in an ordinary state of use, other than when immersed in water. The camera thus constructed is usable in any ordinary state as a drip-proof camera.

However, the breathing and water-impermeable filter used in such a drip-proof camera is limited in the amount of pressure it can withstand while preventing water penetration. As a result, the filter may break, thus allowing water penetration into the camera if the lens is forwardly while immersed in water by mistake. Particularly, in the case of a power-driven zoom lens camera, the switch for zooming operation may be operated by mistake (e.g., if it is touched by mistake) to cause the lens barrel to move back and forth when the camera is washed with running water or with water held in a basin after the camera has been used on the beach, for instance.

Further, in the case of manual non-drip-proof camera such as a camera having a widely movable lens barrel, water may also penetrate into the lens through the sliding portion of the lens barrel when the lens barrel is backwardly or forwardly moved in the presence of water.

SUMMARY OF THE INVENTION

It is therefore an object of the present invention to provide an improved drip-proof camera having a power-driven lens barrel arranged so as not to be moved in the presence of water therearound, even it a switch the zooming operation is operated by mistake.

Another object of the present invention is to provided an improved drip-proof camera having an alarm function operable when the camera is immersed in water having a hydraulic pressure more than a predetermined value.

According to one aspect of the invention, there is provided a camera having at least one lens barrel arranged to be movable along a predetermined direction said camera comprising:

The camera further includes a detecting mechanism provided on the for detecting water around the camera; and a controlling device for controlling the lens barrel so it will not be moved when water is detected by the detecting mechanism.

According to another aspect of the present invention, there is provided a camera that includes:

a detecting mechanism for detecting the presence of water having hydraulic pressure more than a predetermined value; and an alarm mechanism for indicating in a predetermined manner, when the presence of water is detected by the detecting mechanism.

DESCRIPTION OF THE ACCOMPANYING DRAWINGS

DESCRIPTION OF THE EMBODIMENTS

Figure 1:
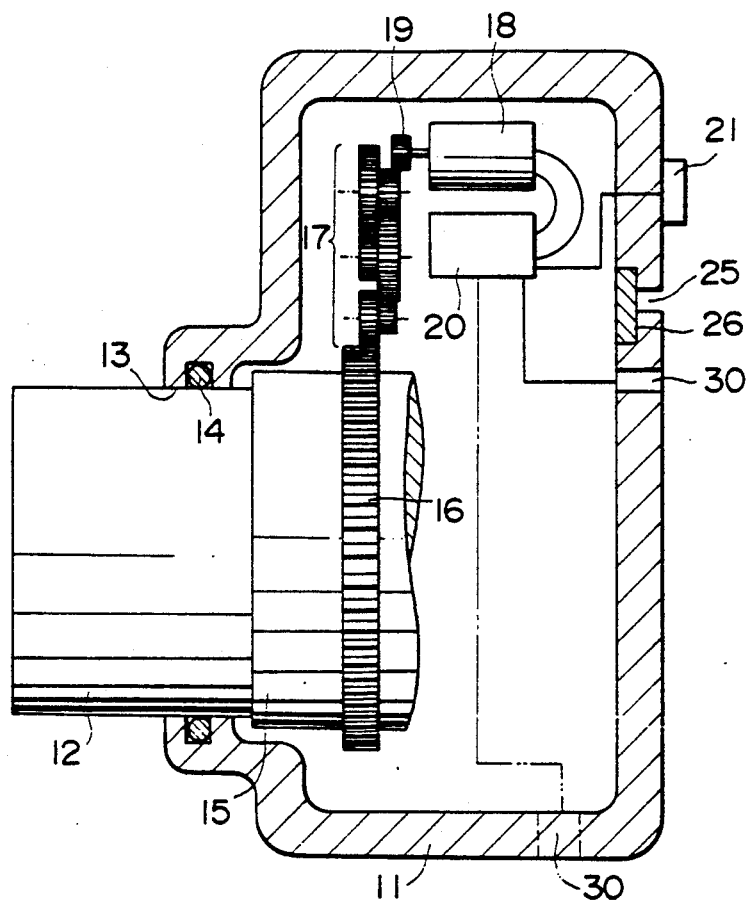
FIG. 1 is a sectional view of a drip-proof camera according to one embodiment of the present invention.
Figure 2:
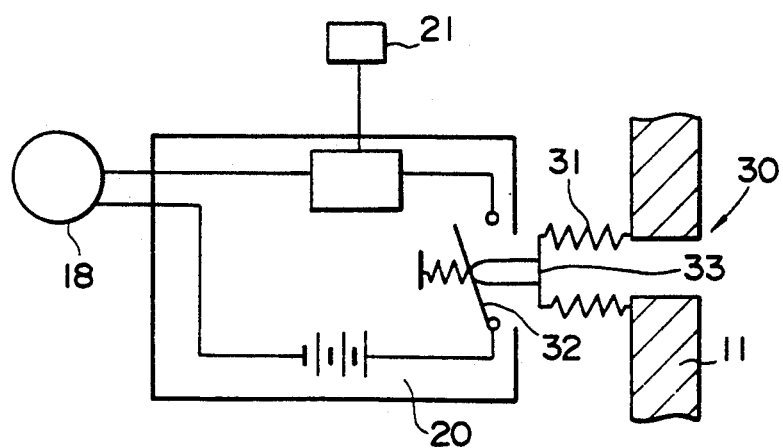
FIG. 2 is an equivalent diagram of a circuit for making a drive motor inoperable as employed in the camera of FIG. 1.

An embodiment of the present invention will be described with reference to the accompanying drawings. FIGS. 1 and 2 illustrate a sectional view of a power-driven zoom camera embodying the present invention and an equivalent diagram of circuit for making the driving motor mounted on the camera of FIG. 1 inoperable. A known sealed construction has been utilized to make the camera body 11 watertight. An opening 13, in which a movable lens barrel 12 is forwardly and rearwardly moved is provided in the front part of the camera body 11, and an O-ring 14 is fitted between the opening 13 and the movable lens barrel 12. A known sealing arrangement has also been employed to make the movable lens barrel 12 itself watertight.

A cam ring 15 to be driven to rotate is disposed in the camera body 11 and the movable lens barrel 12 is caused to move back and forth in the direction of the optical axis as the cam ring 15 revolves. A gear 16 is formed on the outer periphery of the cam ring 15, the gear 16 being arranged to be brought into engagement with a pinion 19 of a drive motor 18 via a gear train 17.

The drive motor 18 is controlled by a motor control circuit 20. The motor control circuit 20 is electrically connected to a zoom switch, i.e., a motor driving switch 21. When the zoom switch 21 is operated, the drive motor 18 rotates forward or backward via the motor control circuit 20. As the drive motor 18 rotates forward or backward, the cam ring 15 also rotates forward or backward via the gear train 17 and the gear 16, whereby the movable lens barrel 12 is caused to move forward or backward.

A venting hole 25 is bored in the camera body 11 and covered with a breathable and water-impermeable filter 26.

In the present invention, the camera body 11 is further provided with a water detection sensor 30. Although the water detection sensor 30 should preferably be provided in the vicinity of the venting hole 25, it may be provided at a plurality of places, including the bottom of the camera body 11 and the like, as shown in FIG. 1. The water detection sensor 30 is connected to the motor control circuit 20. The motor control circuit 20 makes the drive motor 18 inoperable when the water detection sensor 30 detects the presence of water.

FIG. 2 is an equivalent diagram of the circuit for making the drive motor 18 inoperable. The water detection sensor 30 comprises a bellows 31 arranged to be extended when water penetration occurs. The bellows 31 is equipped with a projection 33 for causing a main switch 32 of the motor control circuit 20 to be depressed and turned off. The circuit 20 is thus opened.

The water detection sensor 30 may be, for example, a specific pressure or temperature sensor utilizing a diaphragm as shown in FIG. 2, or a liquid detection sensor or the like for detecting the presence of water from the variation of electric resistance between two points.

In the camera thus constructed, when the water detection sensor 30 detects the presence of water around the camera body 11, the motor control circuit 20 operates to make the drive motor 18 inoperable. In reference to the equivalent diagram of FIG. 2, the bellows 31 expands when water penetrates therethrough and then opens the main switch 32 via the projection 33. The drive motor 18 is accordingly prevented from operating. As a result, the drive motor 18 will not be driven even though the zoom switch 21 is touched by mistake and the movable lens barrel 12 will be prevented from moving. The air pressure within the camera body 11 and the movable lens barrel 12 will thus remain unchanged. There is no fear of causing water to penetrate into the camera body 11 via the venting hole 25 and the breathable and water-impermeable filter 26.

Although the above description has been given of an embodiment of the present invention as applied to the drip-proof camera having the venting hole 25 and the breathable and water impermeable filter 26, the present invention may also be applicable to a non-drip-proof camera. When the water detection sensor 30 provided in the bottom of the camera body 11 detects the presence of water, for instance, the drive motor 18 is prevented from being driven. In this way, water can be prevented from penetrating into the camera body 11 via the slide portion between the camera body 11 of the non-drip-proof camera and the movable lens barrel 12 because of its movement.

Figure 3:
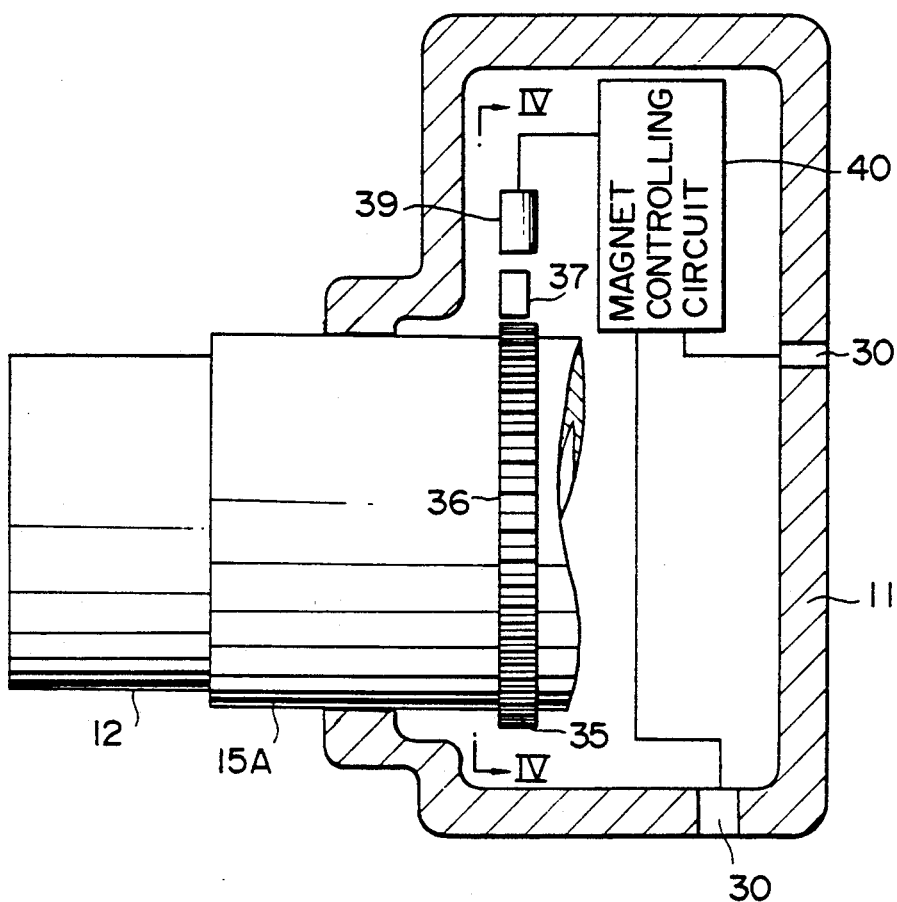
FIG. 3 is a sectional view of a drip-proof camera according to another embodiment of the present invention.
Figure 4:
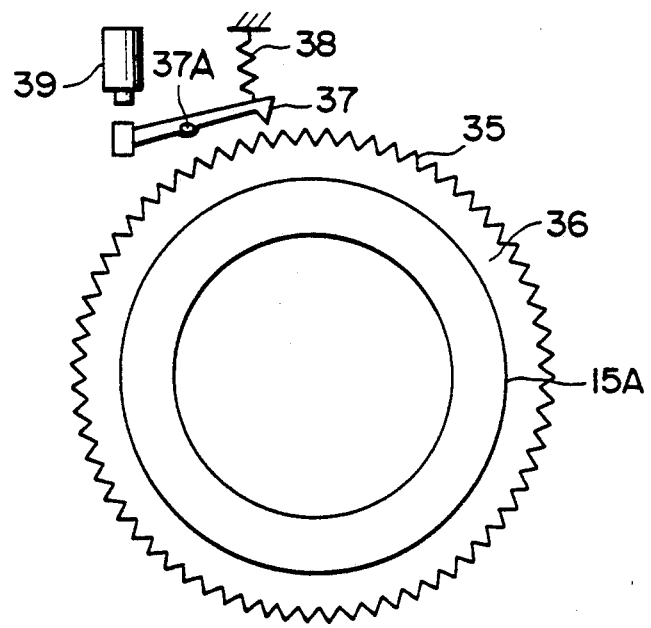
FIG. 4 is a front view of FIG. 3 taken along a line "IV-IV" of FIG. 3.

FIGS. 3 and 4 illustrate another embodiment of the present invention as applied to a manual non-drip-proof zoom lens camera. As shown in FIG. 3, a cam ring 15A is manually revolved and the lens barrel 12 moves as the cam ring revolves. The cam ring 15A incorporates a stopping ring 36 having stopping teeth 35 integrally formed on a circumferential surface thereof. A stopping pawl 37 is pivotally fitted to a shaft 37A opposite to the stopping ring 36. The stopping pawl 37 is interlocked with a spring 38 and a magnet 39. The stopping pawl 37 is biased by the spring 38 in such a manner the stopping pawl 37 is not brought into engagement with the stopping teeth 35. When power is supplied to the magnet 39, the stopping pawl 37 meshes with the mating ring 36 to stoop the revolution of the cam ring 15A. The magnet 39 is energized when the water detection sensor 30 provided in the outer periphery of the camera body 11 and a magnet control circuit 49 detect the presence of water around the camera body 11.

In the embodiment shown, the rotation of the cam ring 15A is prevented when the presence of water around the camera body 11 is detected. Therefore, water can be prevented from penetrating into the camera body 11 via the slide portion between the camera body 11 of the non-drip-proof camera and the movable lens barrel 12 because of its movement.

Although it has been arranged in the embodiment shown that the revolution of the cam ring 15A is simply locked by the stopping teeth 35, and the stopping pawl 37 in accordance with an operation of the magnet 39 energized by the magnet control circuit 40, it may be considered that any mechanism for locking the moving of the lens barrel 12 is used.

The above-described embodiments are arranged in such a manner that the water detection sensor provided on a camera detects the water presence around the camera, and then, in accordance with the result of the detection, the camera is so controlled to ensure that water does not penetrate into the camera, for example, a zoom lens barrel.

Furthermore, the camera may be arranged so as to detect water having hydraulic pressure more than a predetermined value, and to operate a predetermined function, for example, an alarm mechanism for an operator.

Referring to the drawings of FIG. 5 through 7C, embodiments of the camera are shown in which a water detecting hole is provided for detecting water having hydraulic pressure of more than a predetermined value and actuating 97 alarm to inform the operator that the camera is approaching a water resistant limit.

Figure 5:
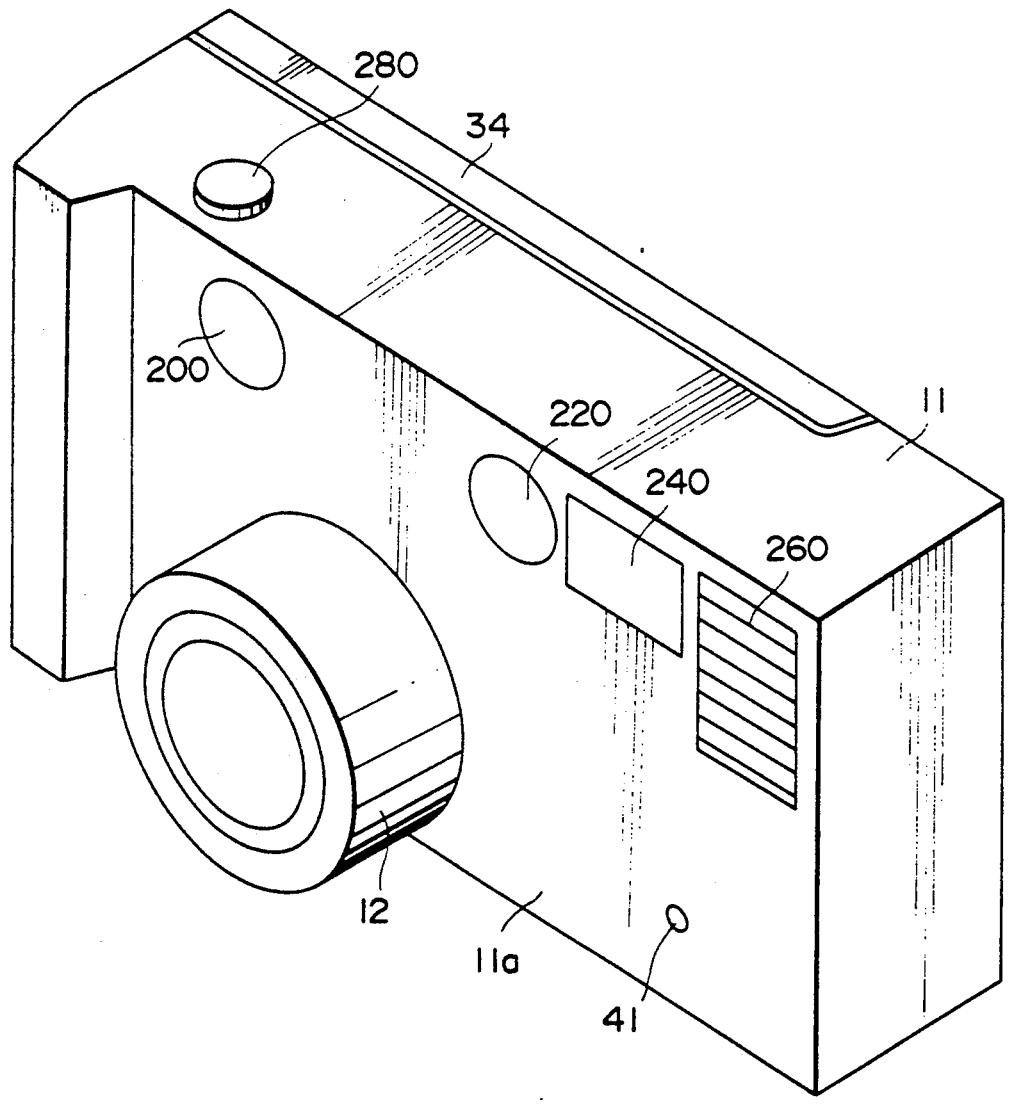
FIG. 5 is a perspective view of the drip-proof camera according to still another embodiment of the present invention.

FIG. 5 shows a perspective view of a camera capable of detecting a predetermined hydraulic pressure.

Figure 6A:
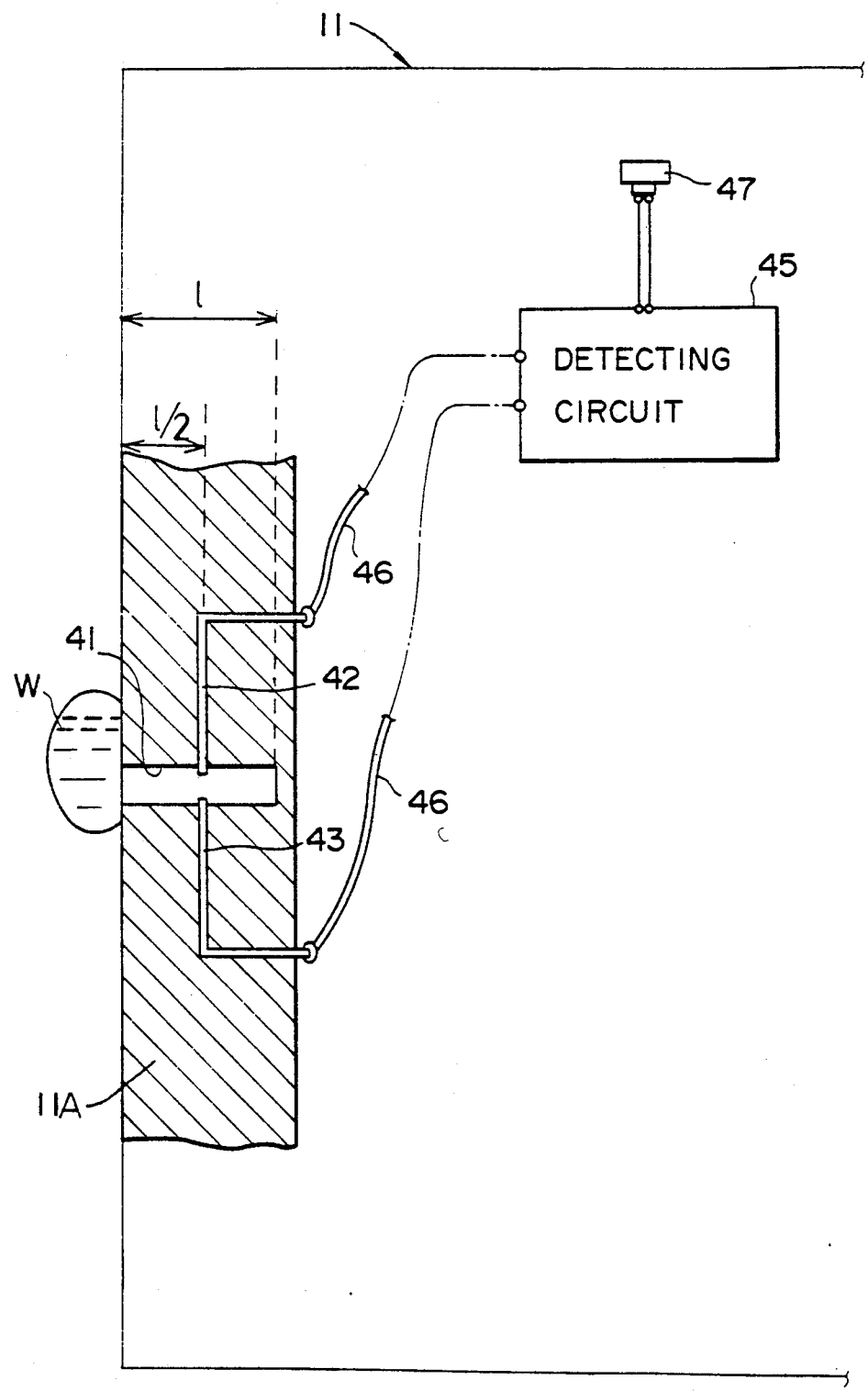
FIG. 6A is a schematic diagram illustrating the principal parts of a drip-proof camera of FIG. 5.
Figure 6B:
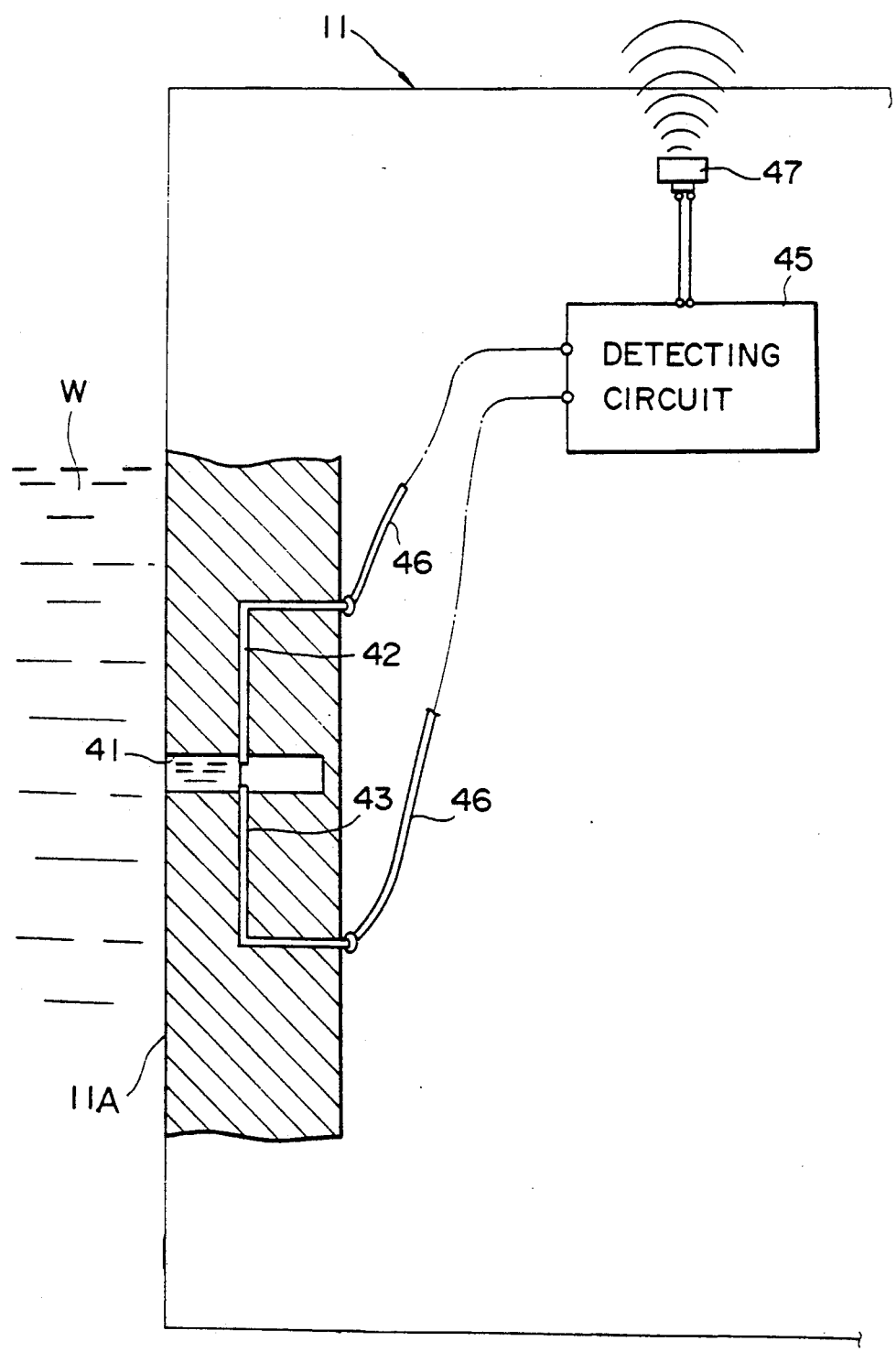
FIG. 6B is a diagram illustrating the state of the camera of FIG. 5 when an alarm has been sounded by a buzzer.

A camera body 11 of the camera is made watertight and its photographic lens barrel 12 is also kept watertight, the same in the previous embodiments. There are provided a zoom switch, not shown, and a release button 280 on the top surface of the camera body 12. A back cover 34 is attached to the rear surface of the camera in a manner to make the cover openable. On the wall surface 11A of the camera body 11 are provided a window 200 from which a predetermined wavelength light, for example, infrared light, is used for measuring the distance to an object to be photographed is projected, a window 220 for receiving the projected light which has been reflected from the surface of the object, a finder 240, and a strobe for emitting light and so on. A closed-end detection hole 41 is further provided under the light-emitting window 260. The closed-end detection hole 41 has a diameter small enough as to prevent a droplet of water from penetrating therethrough because of so-called surface tension of water at normal atmospheric pressure. As shown in FIG. 6A, two electric conductors 42, 43 have been embedded int the front wall 11A. One end of each of the conductors 42, 43 protrude from the inner wall of the closed-end detection hole 41 are exposed at a position nearly half the length of the hole, half-way from its entrance at a spacing large enough to keep the respective ends from contacting one another. The reason for arranging the ends of the conductors 42, 43 respectively, exposed at the position nearly half the length of the hole, half-way from its entrance is to make the conductors 42, 43 conductible when the air within the closed-end detection hole 41 is compressed up to half the total volume due to the penetration of water overcoming the limit of surface tension, that is, when the air pressure doubles (approximately 10 meters in terms of water depth), as shown in FIG. 6B. Thus, by changing the position where the conductors 42, 43 are exposed, the setting of water resistance for detection can also be arbitrarily changed.

The other ends of each of conductors 42, 43 are protruded from the inner front wall 11A of the camera body. A current detection circuit 45 is provided inside the camera body 11. The other ends of the conductors 42, 43 are connected via respective lead wires 46, 46 to the current detection circuit 45. A buzzer 47 functioning an alarm member is also connected to the current detection circuit 45. The current detection circuit 45 detects current when the conductors 42, 43 are electrified and causes the buzzer 47 to sound. The conductors 42, 43 are thus caused to conduct by water. If the camera is used in the water, e.g., in the sea, a lake or swimming pool, normally, such conduction is readily achieved as the water contains various ions. In other words, while pure water is not a conductor, however, the water in the above places acts as a conductor since such water contains various ions.

Therefore, no droplet "w" is allowed to penetrate into the closed-end detection hole 41 is compressed by the water penetrating into the closed-end detection hole 41, which because of the action of surface tension even though the camera 10 thus constructed is exposed to water under the normal atmospheric pressure, as shown in FIG. 6A. When the camera is immersed in water, air inside the closed-end detection hole 41 overcomes the limit of surface tension as the water pressure increases. When the air is compressed up to about half the total volume, that is, when the atmospheric pressure doubles, the conductors 42, 43 are caused to conduct by the water penetrated. At this point the depth of water when the conductors are bridged by the penetrating water approximately 10 meters. Since the conductors 42, 43 are actually arranged so that they conduct at a depth of somewhat less than 10 meters, the buzzer 47 sounds to issue an alarm before the camera reaches the limit of water pressure. An operator is thus warned not to lower the camera any deeper into the water.

Figure 7A:
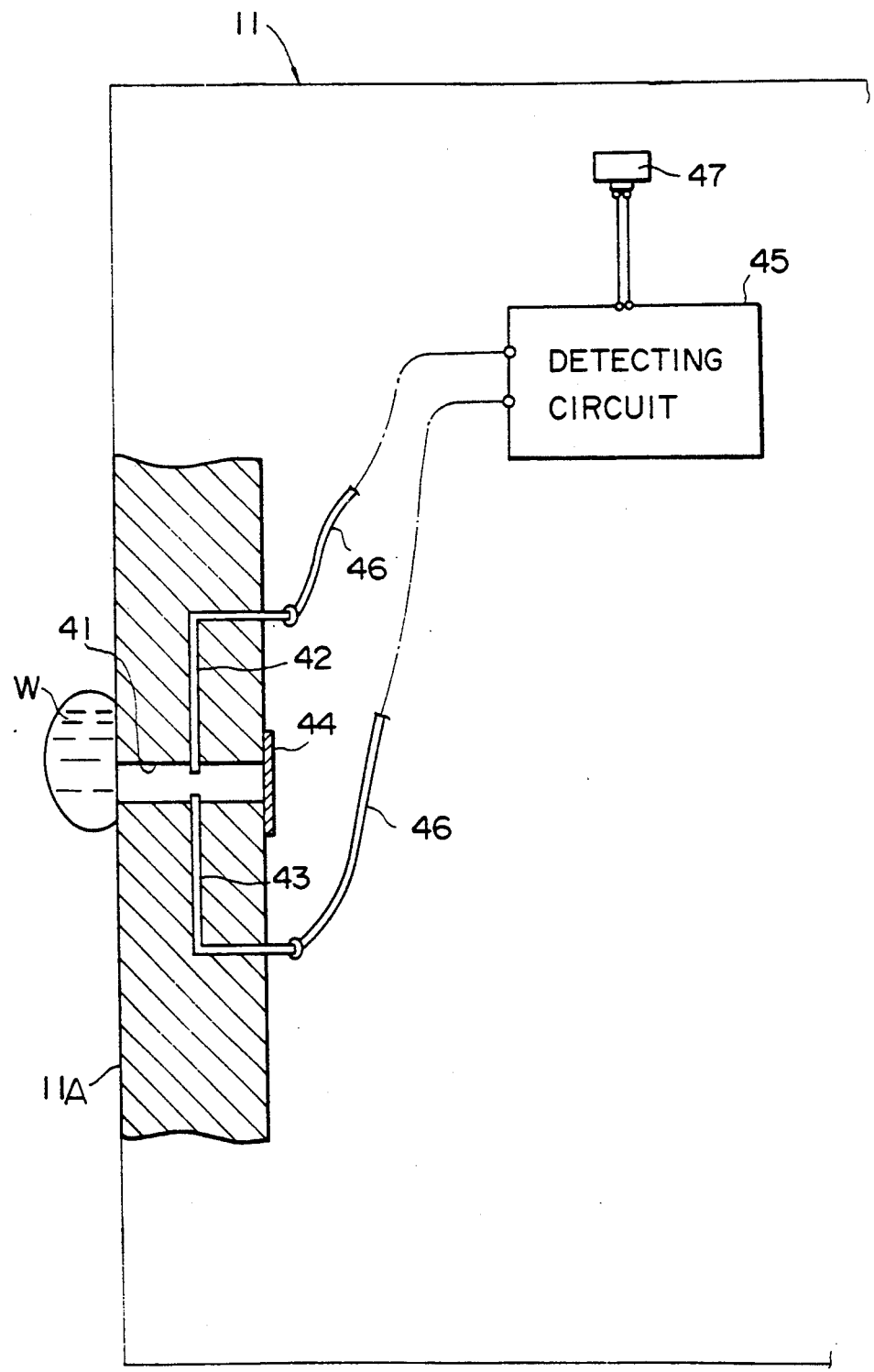
FIG. 7A is a schematic diagram illustrating the principal parts of a drip-proof camera according to still another embodiment of the present invention.
Figure 7B:
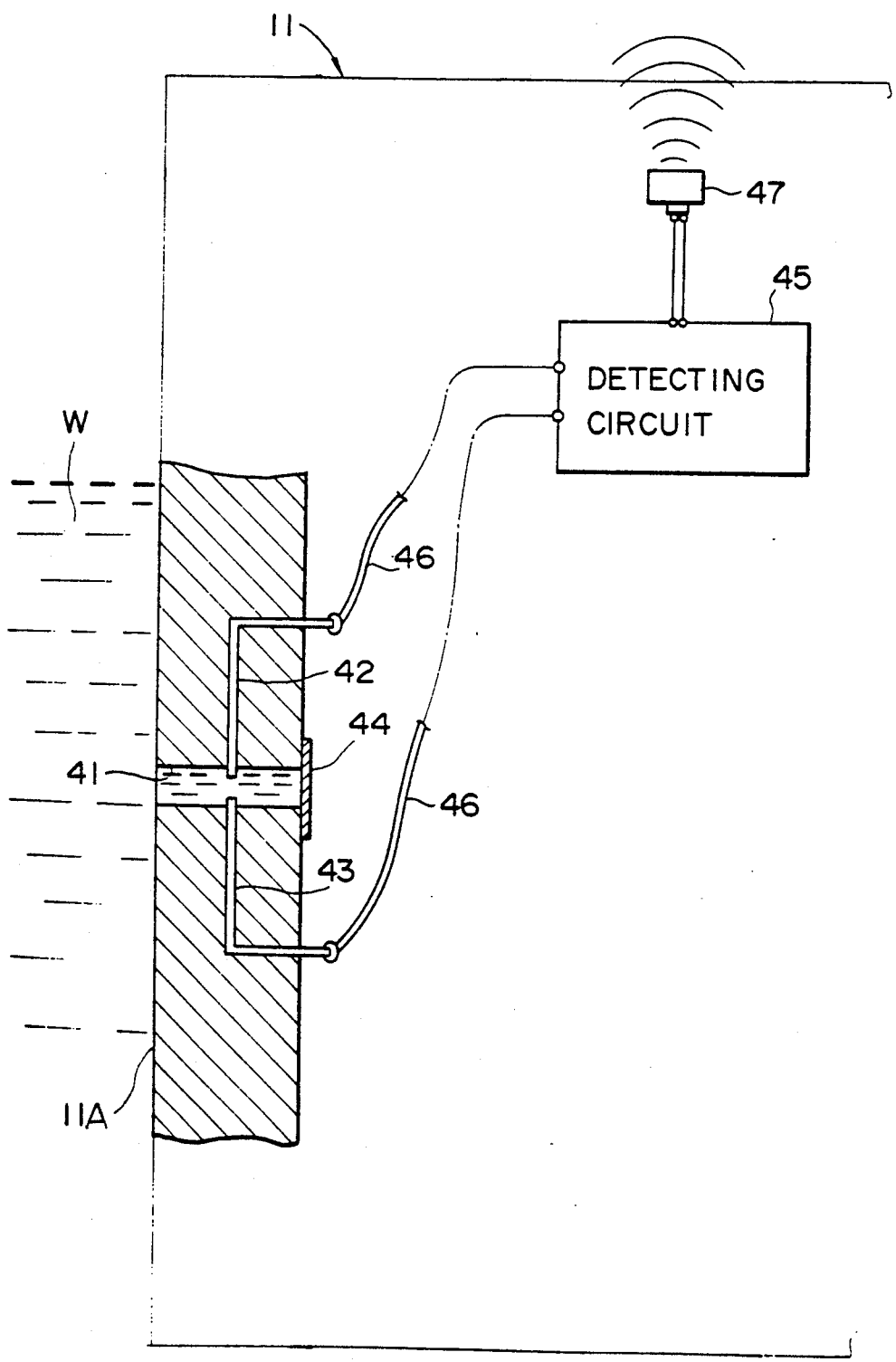
FIG. 7B is a diagram illustrating the state of the camera of FIG. 7A when an alarm has been sounded by a buzzer.

Referring to drawings of FIGS. 7A and 7B, another embodiment will be described. In this embodiment, as shown in FIG. 7A, a water repellent breathing and water-impermeable filler 44 is made to watertightly adhere to the inner wall of the camera body behind a through-hole 41 provided on the front wall 11A. In this structure, no droplet "w" is allowed to penetrate into the through-hole 41 because of the action of surface tension even though the camera thus constructed is exposed to water as shown in FIG. 7A. When the camera is immersed in water, the water "W" overcomes the limit of surface tension because of the water pressure and penetrates into the through-hole 41 while driving air therein via the breathable and water-impermeable filter 44, into the camera body 12 as shown in FIG. 7B. The penetrating water causes the conductors 42, 43 to conduct and is stopped by the breathable and water-impermeable filter 44 from penetrating into the camera body 12. The current detection circuit 45 detects the conduction of the conductors 42, 43 and thereby causes the buzzer 47 to issue an alarm. The operator becomes aware of the alarm and then raises the camera above the surface of water. The camera is thus prevented from being damaged.

Figure 7C:
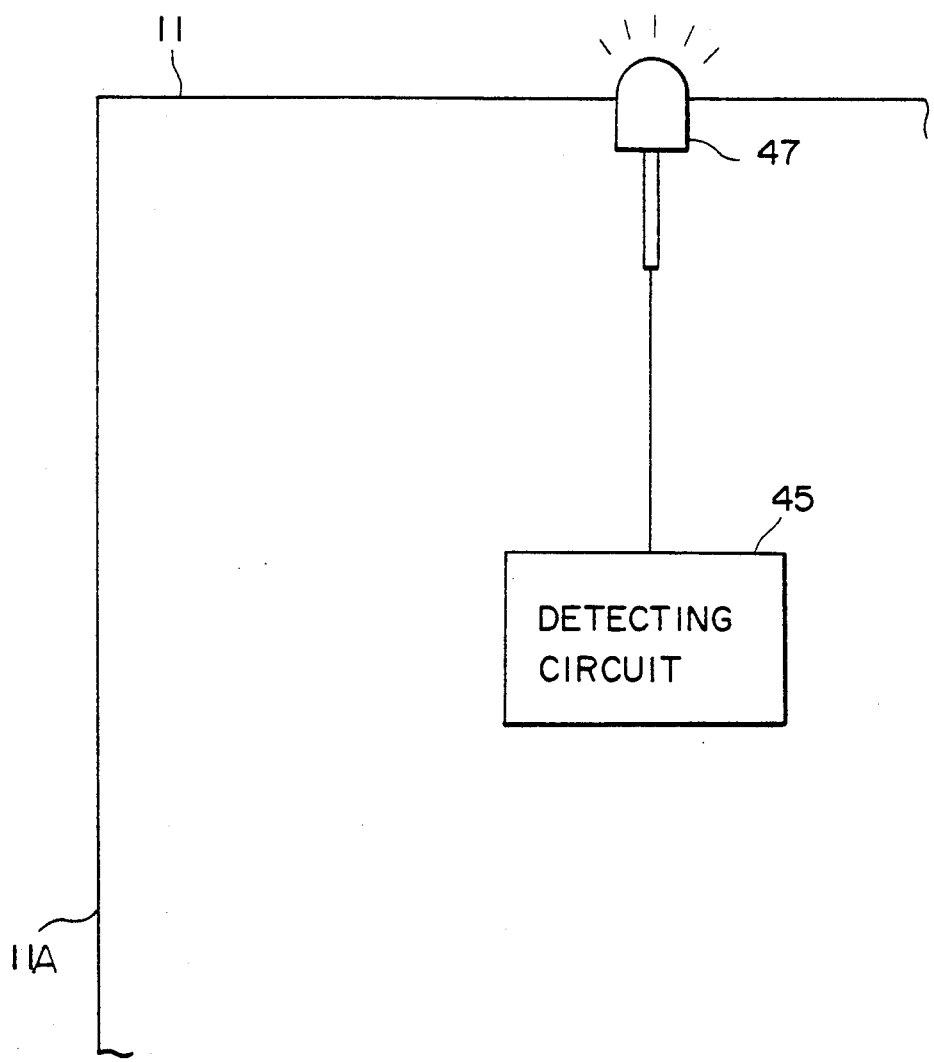
FIG. 7C is a diagram illustrating the state when alarm has been indicated by a light-emitting diode.

Although the buzzer 47 has been employed as the alarm member in the above described embodiments, a light-emitting member such as an LED (Light Emitting Diode) may be used instead of the buzzer, as shown in FIG. 7C.

As described above, according to the present invention, a lens barrel arranged to be movable is locked when the presence of water is detected by a water detection sensor. Therefore, it becomes possible to prevent the water from penetrating into the camera. Further, according to the present invention, the camera is capable of issuing an alarm to warn an operator not to lower the camera further when it reaches the depth corresponding to the set water resistance. As a result, the camera according to the present invention is capable of preventing situations in which it is lowered deeper than the preset limit becomes consequently damaged without issuing a warning of the fact that it has reached the depth of water corresponding to the predetermined water pressure.

What is claimed is:

1. A camera adapted to be sealed against water, said camera comprising:
   detecting means for detecting the presence of water having a hydraulic pressure greater than a predetermined value about said camera; and
   means for generating an alarm signal when the presence of water at the predetermined hydraulic pressure is detected by said detecting means.

2. The camera according to claim 1, wherein said detecting means comprises a closed-end hole provided on an outer surface of said camera whose diameter is selected so as to prevent a water droplet from penetrating into said closed-end hole because of the surface tension of the water, when the hydraulic pressure is less than said predetermined value and a water sensing member provided at a predetermined position in said closed-end hole for sensing the water penetrating into said closed-end hole against the surface tension.

3. The camera according to claim 2, wherein said water sensing member comprises a pair of conductor members positioned opposite to each other at said predetermined position in said closed-end hole, whereby said pair of conductor members are adapted to be electronically connected, when water at a hydraulic pressure greater than said predetermined value penetrates said closed-end hole, and when the air in said closed-end hole is compressed by said water.

4. The camera according to claim 1, wherein said detecting means comprises a through-hole provided on an outer surface of said camera whose diameter is selected so as to prevent a droplet from penetrating through said through-hole because of the surface tension of the water, when the hydraulic pressure is less than said predetermined value and a water sensing member provided in said through-hole for sensing the water penetrating into said through-hole against the surface tension.

5. The camera according to claim 4 wherein said water sensing member comprises a pair of conductor members positioned opposite to each other in said through-hole, whereby said pair of conductor members are adapted to be electrically connected, when water penetrates into said through-hole against tension, and when the air in said through-hole is pushed toward the inside of said camera.

6. The camera according to claim 1, wherein said alarm means comprises a sounding member adapted to operate when the presence of water is detected by said detecting means.

7. The camera according to claim 6, wherein said sounding member comprises a buzzer.

8. The camera according to claim 1, wherein said alarm means comprises a light-emitting member adapted to operate when the presence of water is detected by said detecting means.

9. The camera according to claim 8, wherein said light-emitting member comprises a light-emitting diode.

10. The camera according to claim 2, wherein said predetermined position is half the length of said closed-end hole.

11. The camera according to claim 4, which further comprises a breathable and water-impermeable filter located between the end of said through-hole and the 12. A camera adapted to be sealed against water, said camera comprising:
    detecting means for detecting presence of water having a hydraulic pressure greater than a predetermined value, said detecting means comprising a closed-end hole provided on an outer surface of said camera, said hole having a diameter which is adapted to prevent a droplet from penetrating into said closed-end hole because of the surface tension of the water when the hydraulic pressure is less than said predetermined value, and a water sensing member provided at a predetermined position in said closed-end hole for sensing water at the predetermined hydraulic pressure penetrating into said closed-end hole against the surface tension; and
    means for generating an audible alarm signal arranged to operate when the presence of water is detected by said detecting means.

13. The camera according to claim 12, wherein said water sensing member comprises a pair of conductor members positioned opposite to each other at said predetermined position in said closed-end hole, and wherein said alarm means comprises a buzzer.

14. A camera adapted to be sealed against water, comprising:
    detecting means for detecting the presence of water having a hydraulic pressure greater than a predetermined value, comprising a closed-end hole provided on an outer surface of said camera, said hole having a diameter which is adapted to prevent a droplet from penetrating into said closed-end hole because of the surface tension of the water when the hydraulic pressure is less than said predetermined value, and a water sensing member provided at a predetermined position in said closed-end hole for sensing the water at the predetermined hydraulic pressure penetrating into said closed-end hole; and
    alarm means for generating a visible alarm signal, said alarm means being adapted to operate when the presence of water is detected by said detecting means.

15. The camera according to claim 14, wherein said water sensing member comprises a pair of conductor members positioned oppositely to each other at said predetermined position in said closed-end hole, and wherein said alarm means comprises a light-emitting diode.

16. A camera adapted to be sealed against water, said camera comprising:
    detecting means for detecting the presence of water having a hydraulic pressure greater than a predetermined value, said detecting means comprising a through-hole provided on an outer surface of said camera whose diameter is adapted to prevent a droplet from penetrating through said through-hole because of the surface tension of the water when the hydraulic pressure is less than said predetermined value, and a water sensing member provided at a predetermined position in said through-hole for sensing water at the predetermined hydraulic pressure penetrating into said through-hole; and
    alarm means for generating an audible alarm signal, said alarm means being adapted to operate when the presence of water is detected by said detecting means.

17. The camera according to claim 16, wherein said water sensing member comprises a pair of conductor members positioned oppositely to each other in said through-hole, and wherein said alarm means comprises a buzzer.

18. A camera adapted to be sealed against water, said camera comprising:
    detecting means for detecting the presence of water having a hydraulic pressure greater than a predetermined value, said detecting means comprising a through-hole provided on an outer surface of said camera whose diameter is adapted to prevent a droplet from penetrating through said through-hole because of the surface tension of the water when the hydraulic pressure is less than said predetermined value, and a water sensing member provided at a predetermined position in said through-hole for sensing the water at the predetermined hydraulic pressure penetrating into said through-hole; and
    alarm means for generating a visible alarm signal, said alarm means being adapted to operate when the presence of water is detected by said detecting means.

19. The camera according to claim 18, wherein said water sensing member comprises a pair of conductor members positioned oppositely to each other in said through-hole, and wherein said alarm means comprises a light-emitting diode.

* * * * *

UNITED STATES PATENT AND TRADEMARK OFFICE
CERTIFICATE OF CORRECTION

PATENT NO. : 5,111,222
DATED : May 5, 1992
INVENTOR(S) : M. HAYAKAWA et al.

It is certified that error appears in the above-indentified patent and that said Letters Patent is hereby corrected as shown below:

At column 7, line 26 (claim 11, line 3) of the printed patent, insert ---inside of said camera.--- after "and the".

Signed and Sealed this

Twenty-sixth Day of July, 1994

Attest:

BRUCE LEHMAN

Attesting Officer             Commissioner of Patents and Trademarks